US009421841B2

(12) United States Patent
Iwami et al.

(10) Patent No.: US 9,421,841 B2
(45) Date of Patent: Aug. 23, 2016

(54) HYDRAULIC SUSPENSION SYSTEM FOR WORK VEHICLE

(71) Applicant: Kubota Corporation, Naniwa-ku, Osaka-shi, Osaka (JP)

(72) Inventors: Kenichi Iwami, Sakai (JP); Shigeki Hayashi, Sakai (JP); Atsushi Hayashi, Nara (JP); Akihiro Matsuzaki, Sakai (JP); Toshimitsu Yazaki, Sakai (JP); Nobuyuki Okabe, Izumi (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/705,392

(22) Filed: May 6, 2015

(65) Prior Publication Data

US 2015/0231943 A1 Aug. 20, 2015

Related U.S. Application Data

(62) Division of application No. 13/687,335, filed on Nov. 28, 2012, now Pat. No. 9,045,016, which is a division of application No. 12/561,637, filed on Sep. 17, 2009, now Pat. No. 8,406,955.

(30) Foreign Application Priority Data

Dec. 26, 2008 (JP) ................................. 2008-332949
Jan. 13, 2009 (JP) ................................. 2009-004673

(51) Int. Cl.
*G06F 19/00* (2011.01)
*B60G 17/016* (2006.01)

(52) U.S. Cl.
CPC ....... *B60G 17/016* (2013.01); *B60G 2300/082* (2013.01); *B60G 2500/114* (2013.01); *B60G 2800/16* (2013.01)

(58) Field of Classification Search
CPC ............ B60G 17/016; B60G 2800/16; B60G 2500/114; B60G 2300/082
See application file for complete search history.

(56) References Cited

U.S. PATENT DOCUMENTS

| 6,145,859 A | 11/2000 | Altherr et al. |
| 6,343,661 B1 * | 2/2002 | Thompson ........... A01C 23/008 172/444 |
| 2008/0290624 A1 * | 11/2008 | Yamanaka ............. B60G 13/14 280/124.154 |

FOREIGN PATENT DOCUMENTS

| JP | 03032912 A | 2/1991 |
| JP | 10324134 A | 12/1998 |
| JP | 11011132 A | 1/1999 |

* cited by examiner

*Primary Examiner* — Kim T Nguyen
(74) *Attorney, Agent, or Firm* — The Webb Law Firm

(57) ABSTRACT

The hydraulic suspension system comprises a suspension mechanism for a traveling vehicle body, a suspension reference position variation mechanism for varying a reference position of a suspension stroke of the suspension mechanism, and a stopped state detector for detecting a state in which operation of the suspension mechanism has stopped. The control management unit controls the suspension reference position variation mechanism so that when operation of the suspension mechanism is detected by the stopped state detector to be in a stopped state, the operation of the suspension mechanism moves toward a target range, in preference to control based on a suspension stroke position obtained from a suspension stroke position sensor.

6 Claims, 8 Drawing Sheets

HYDRAULIC SUSPENSION SYSTEM FOR WORK VEHICLE

CROSS-REFERENCE TO RELATED APPLICATIONS

This application is a divisional of U.S. patent application Ser. No. 13/687,335, filed on Nov. 28, 2012, which is a divisional of U.S. patent application Ser. No. 12/561,637, filed Sep. 17, 2009, now U.S. Pat. No. 8,406,955, which claims priority to JP 2008-332949 filed on Dec. 26, 2008 and JP 2009-004673 filed on Jan. 13, 2009, all of which are incorporated by reference in their entirety.

BACKGROUND OF THE INVENTION

1. Field of the Invention

The present invention relates to a suspension system for a tractor or another work vehicle.

2. Description of the Related Art

Among tractors, which are an example of a work vehicle, there are those which comprise a suspension mechanism in the front wheels, such as is disclosed in U.S. Pat. No. 6,145,859, for example. A suspension mechanism generally acts in rising and falling motions in accordance with unevenness in the ground surface, whereby the unevenness in the ground is absorbed and the ride is made more comfortable.

Worked ground on which the work vehicle travels has much unevenness in comparison with paved roads, and the work vehicle is often equipped with an implement, which causes the suspension stroke position of the suspension mechanism to deviate upward or downward of the vehicle body from a preset target range (when the suspension stroke position of the suspension mechanism is positioned in the target range, the vehicle height is maintained within the height range), whereby the vehicle height goes beyond the predetermined height range (unusual fluctuation).

In this case, it is preferable to minimize unusual fluctuations in the vehicle height of the work vehicle and to maintain the vehicle height within the predetermined range. Therefore, it has been proposed that when the suspension stroke position of the suspension mechanism deviates upward or downward of the vehicle body from the target range as previously described, the vehicle height should be maintained as much as possible within the predetermined height range by a suspension reference position variation mechanism for moving the suspension stroke position of the suspension mechanism to the target range.

A suspension system of a work vehicle such as the one previously described has the following problem in cases in which a suspension reference position variation mechanism is provided for varying the reference position of the suspension stroke in relation to the suspension mechanism. Specifically, every time the suspension mechanism operates and the suspension stroke position of the suspension mechanism deviates upward or downward of the vehicle body from the target range, the operative frequency of the suspension reference position variation mechanism is extremely high when the suspension reference position variation mechanism operates, and the suspension reference position variation mechanism has a disadvantage in terms of durability.

SUMMARY OF THE INVENTION

The present invention is a suspension system of a work vehicle, the object of which is to reduce the operative load of the suspension reference position variation mechanism and to create favorable conditions pertaining to durability.

In order to achieve this objective, the hydraulic suspension system according to the present invention comprises a suspension mechanism for a traveling vehicle body, a suspension reference position variation mechanism for varying the reference position of a suspension stroke of the suspension mechanism, a suspension stroke position sensor for detecting the suspension stroke position (rising/lowering displacement), and a control unit for controlling the suspension reference position variation mechanism on the basis of the suspension stroke position so that the stroke of the suspension mechanism moves toward a preset target range. The hydraulic suspension system also comprises a stopped state detector for detecting a state in which operation of the suspension mechanism has stopped, and a control management unit for supplementarily, or preferably preferentially, controlling the suspension reference position variation mechanism. The control management unit controls the suspension reference position variation mechanism so that when the operation of the suspension mechanism is detected to be in a stopped state, the operation of the suspension mechanism moves toward the target range, in preference to control based on the suspension stroke position obtained from the suspension stroke position sensor.

For example, when a loader, a plow, or another implement is linked to the work vehicle and the implement is raised to a raised non-operating state, the entire load of the implement is applied to the traveling vehicle body; and when the implement is lowered to a lowered operating state, the load applied to the traveling vehicle body decreases because the implement is supported on the ground. Particularly in cases in which earth has been lifted by a loader, a large load is applied to the traveling vehicle body by the weight of the lifted earth; and in cases in which the earth has been released by the loader, there is no longer the large load that was applied to the traveling vehicle body by the lifted earth.

In other words, in cases in which the suspension mechanism operates due to a small load caused by ground surface unevenness or the like, the suspension mechanism undergoes return displacement in a vehicle body lowering direction after being displaced in a vehicle body rising direction, or return displacement in the vehicle body rising direction after being displaced in the vehicle body lowering direction. In cases in which work has been performed by the implement, the large load applied to the traveling vehicle body by whatever is being handled by the implement is either created or lost, whereby the suspension mechanism is greatly displaced in the vehicle body rising direction or the vehicle body lowering direction, and there are instances in which there is no return displacement or the return displacement is small. In other words, when the suspension mechanism has been displaced in the vehicle body rising direction or the vehicle body lowering direction, a so-called state of stopped operation occurs in the suspension mechanism, wherein the suspension mechanism remains displaced in the vehicle body rising direction or the vehicle body lowering direction, and either there is no return displacement thereafter or the return displacement is small.

In view of this, the state in which the operation of the suspension mechanism has stopped is detected by a stopped state detector, and based on the detection information, a control management unit controls the reference position variation mechanism in preference to the detection information from the suspension stroke position sensor, so that the reference position of the suspension mechanism moves toward a target range. The terrain clearance of the traveling vehicle body can thereby be maintained in a predetermined height range even when the suspension mechanism undergoes significant operative displacement as a result of the implement being linked or the implement doing work.

Moreover, in cases in which displacement caused by a small load of the suspension mechanism continues and no state of stopped operation occurs in the suspension mechanism, the reference position variation mechanism is controlled by the control unit on the basis of the detection information from the suspension stroke position sensor. At this time, deterioration of the reference position variation mechanism is suppressed by making the operating frequency of the reference position variation mechanism relatively low. In cases in which a load is applied by the weight of the implement or by the weight of whatever is being handled by the implement, or the load from whatever is being handled by the implement is lost; the control management unit controls the reference position variation mechanism on the basis of the detection information from the stopped state detector, in preference to the detection information from the suspension stroke position sensor. It is thereby possible to quickly adapt to operative displacement of the suspension mechanism caused by loads resulting from the weight of the implement or the weight of whatever is being handled by the implement, and to move the reference position of the suspension mechanism in the target direction. As a result, the traveling vehicle body and the implement are maintained at an appropriate terrain clearance or a height close thereto.

In order to achieve the objectives described above, another hydraulic suspension system according to the present invention comprises an intermediate value calculator for detecting the maximum position and minimum position of the suspension stroke and calculating an intermediate value between the maximum and minimum positions, and a cumulating unit for cumulating the frequency at which the intermediate position deviates from a target range as a cumulative frequency. The control unit controls the operation variation mechanism so that the intermediate position moves in a preset target direction when the cumulative frequency obtained from the cumulating unit exceeds a preset cumulative frequency. The control management unit controls the suspension reference position variation mechanism so that when the operation of the suspension mechanism is detected to be in a stopped state, the operation of the suspension mechanism moves toward the target range, in preference to control based on the cumulative frequency obtained from the cumulating unit.

In this configuration, when the reference position deviates from the target range, an immediate correction is not necessarily made by the reference position variation mechanism. In other words, in cases in which displacement caused by a small load continues in the suspension mechanism, the suspension mechanism is either displaced in the vehicle body lowering direction after being displaced in the vehicle body rising direction, or is displaced in the vehicle body rising direction after being displaced in the vehicle body lowering direction, whereby the maximum and minimum positions occur sequentially. The maximum position and minimum position of suspension mechanism displacement are thereby detected. The intermediate position between the maximum and minimum positions is compared with the target range and the frequency at which the intermediate position deviates from the target range is cumulated, and when the cumulative frequency exceeds a set cumulative frequency, the reference position variation mechanism functions so that the intermediate position moves toward the target range. Therefore, even when the suspension mechanism displacement is displaced from the target range in the vehicle body rising direction and the vehicle body lowering direction, and also when the intermediate position is displaced from the target range in the vehicle body rising direction and the vehicle body lowering direction, the reference position variation mechanism does not operate if the frequency at which the intermediate position deviates from the target range does not exceed the set cumulative frequency.

A state in which operation of the suspension mechanism has stopped is detected by the stopped state detector, and the control management unit controls the reference position variation mechanism on the basis of the detection results, in preference to control based on the cumulative frequency obtained from the cumulating unit. Thereby, in cases in which the suspension mechanism undergoes significant operative displacement due to the linking of the implement or to the implement doing work, adaptation is quickly made and the reference position of the suspension mechanism is moved in the target direction, whereby the terrain clearance of the traveling vehicle body can be maintained in the predetermined height range.

Other characteristics and merits of the present invention should be clear from the descriptions of the embodiments using the following drawings.

DESCRIPTION OF THE PREFERRED EMBODIMENTS

The preferred embodiments of the present invention are described hereinbelow with reference to the accompanying drawings. The characteristics of one embodiment can be combined with the characteristics of another embodiment, and such combinations are included within the scope of the present invention as long as there are no discrepancies.

Examples of the present invention are described hereinbelow with reference to the drawings.

Figure 1:
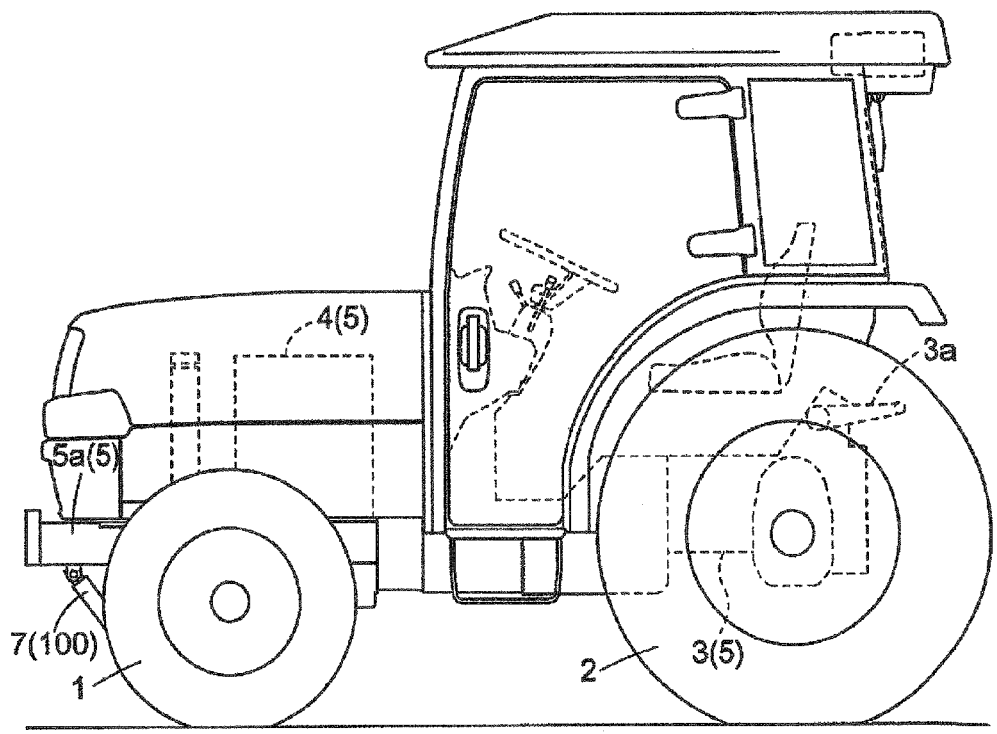
FIG. 1 is an overall side view of an agricultural tractor.

A tractor, given as an example of a work vehicle, is configured comprising front wheels 1, 1 as a pair of left and right travel devices and a pair of left and right rear wheels 2, 2, as shown in FIG. 1.

A traveling vehicle body 5 of the tractor comprises an engine 4, a transmission case 3 linked to the rear part of the engine 4, and a front wheel support frame 5a linked to the bottom part of the engine 4 so as to support the front wheels, as shown in FIG. 1. The traveling vehicle body 5 comprises lift arms 3a mounted in a vertically swingable manner on both transverse sides of the rear part of the transmission case 3. The right and left front wheels 1 are attached to the traveling vehicle body 5 via a suspension mechanism 100. The right and left rear wheels 2 are directly attached to the transmission case 3 at the rear part of the vehicle body constituting the traveling vehicle body 5, without the aid of a suspension mechanism.

The tractor is capable of functioning as any of a variety of ridden work vehicles in which various implements are linked in a raisable and lowerable manner to the rear part of the traveling vehicle body 5. For example, the tractor functions as a ridden tiller in which a plow (not shown) is linked in a raisable and lowerable manner between a raised non-working state and a lowered working state, to the rear part of the traveling vehicle body 5 via the lift arms 3a. The tractor also functions as a ridden loader in which a front loader (not shown) is linked in a raisable and lowerable manner to the front part of the traveling vehicle body 5.

Figure 2:
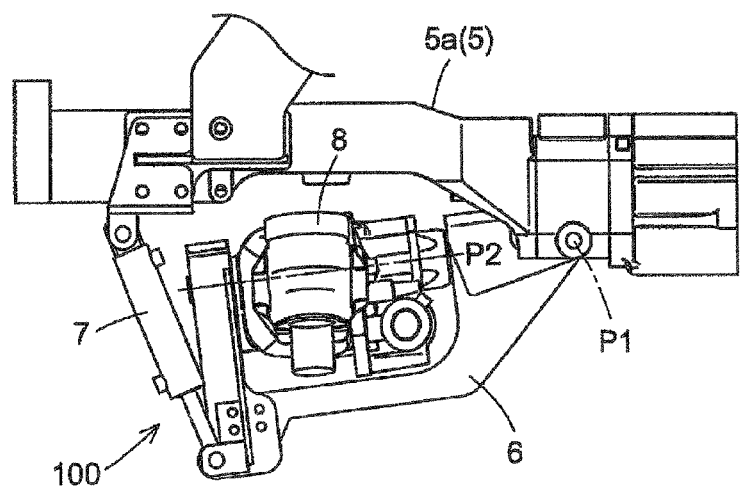
FIG. 2 is a side view of the vicinity of a front wheel axle case, a support bracket, and a hydraulic cylinder.
Figure 4:
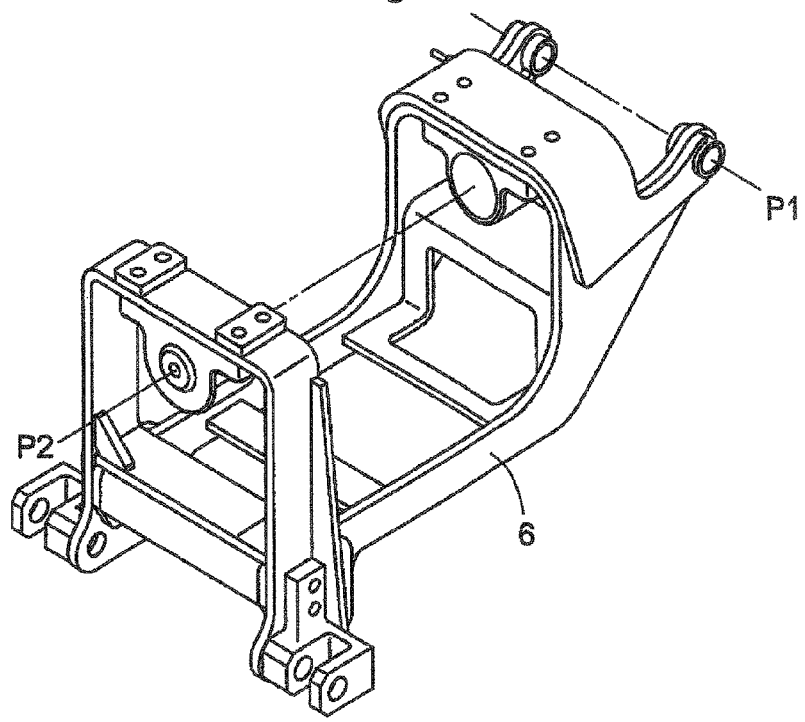
FIG. 4 is a perspective view of the support bracket.

At the bottom part of the engine 4 disposed at the front part of the vehicle body, a support frame 5 is linked and made to extend forward, a support bracket 6 having a U shape in a side view is supported so as to be capable of swinging vertically about a transverse axis P1 at the rear part of the support frame 5, and two hydraulic cylinders 7 (included in the suspension mechanism) are connected between the front part of the support frame 5 and the front part of the support bracket 6, as shown in FIGS. 1, 2, and 4. A front wheel axle case 8 is supported so as to be capable of rolling about a longitudinal axis P2 of the support bracket 6, and the right and left front wheels 1 are supported on the right and left sides of the front wheel axle case 8.

Next, the hydraulic circuit structure of the hydraulic cylinders 7 will be described.

Figure 3:
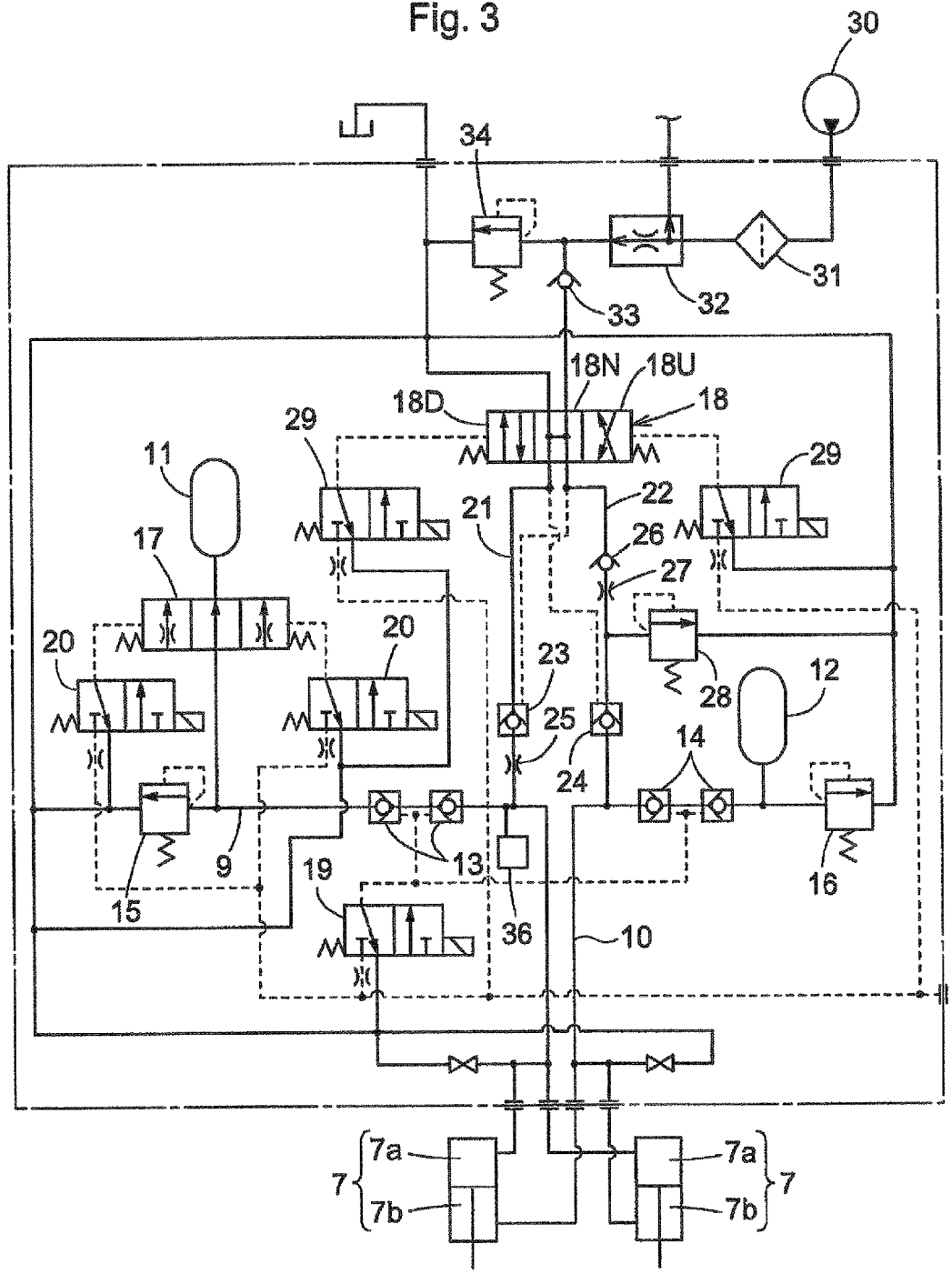
FIG. 3 is a drawing showing a hydraulic circuit structure of the hydraulic cylinders.

The hydraulic cylinders 7 are configured as double-acting cylinders comprising oil chambers 7a on the bottom side and oil chambers 7b on the piston side, as shown in FIG. 3. An oil passage 9 is connected to the oil chambers 7a of the hydraulic cylinders 7, and connected to the oil passage 9 are a gas-filled accumulator 11, a pair of pilot-operated check valves 13, and a relief valve 15 for preserving the hydraulic circuit. A pilot-operated switching valve 17 having orifices of three different aperture sizes, "large," "medium," and "small," are provided to the frontal portion of the accumulator 11, and pilot valves 20 are provided for operating the switching valve 17. An oil passage 10 is connected to the oil chambers 7b of the hydraulic cylinders 7, and connected to the oil passage 10 are a gas-filled accumulator 12, a pair of pilot-operated check valves 14, and a relief valve 16 for preserving the hydraulic circuit.

A pilot valve 19 through which actuating oil passes to and from the check valves 13, 14 is provided as shown in FIG. 3, and the check valves 13, 14 are operated by the pilot valve 19 to a shutoff state (a state of shutting off the accumulators 11, 12 from the oil chambers 7a, 7b of the hydraulic cylinders 7) and an open state (a state of allowing actuating oil to flow from both accumulators 11, 12 to the oil chambers 7a, 7b of the hydraulic cylinders 7, and also from the oil chambers 7a, 7b of the hydraulic cylinders 7 to the accumulators 11, 12).

The actuating oil of a pump 30 is supplied to a control valve 18 (equivalent to a suspension reference position variation mechanism) via a filter 31, a flow-dividing valve 32, and a check valve 33; and a relief valve 34 is connected between the flow-dividing valve 32 and the check valve 33, as shown in FIG. 3. An oil passage 21 is connected from the control valve 18 to the portion of the oil passage 9 between the oil chambers 7a of the hydraulic cylinders 7 and the check valves 13, and an oil passage 22 is connected from the control valve 18 to the portion of the oil passage 10 between the oil chambers 7b of the hydraulic cylinders 7 and the check valves 14.

The control valve 18 is configured to be pilot-operated in a three-position switching system, including a raised position 18U for supplying actuating oil to the oil passage 21 (the oil chambers 7a of the hydraulic cylinders 7), a lowered position 18D for supplying actuating oil to the oil passage 22 (the oil chambers 7b of the hydraulic cylinders 7), and a neutral position 18N; and a pilot valve 29 is provided for operating the control valve 18, as shown in FIG. 3.

The oil passage 21 is provided with a pilot-operated check valve 23 and an aperture 25, as shown in FIG. 3. The oil passage 22 is provided with a pilot-operated check valve 24, a check valve 26 (the check valve 24 is near the oil passage 10 and the check valve 26 is near the control valve 18), and an aperture 27; and a relief valve 28 is connected between the check valve 24 and the check valve 26 (the aperture 27).

The pilot valves 19, 20, 29 are electromagnetically operated. The pilot valve 19 and the pilot valves 20, 29 are operated by a control unit 35, described hereinafter, and the check valves 13, 14, the control valve 18, and the switching valve 17 are operated.

Next, the action of the hydraulic cylinders 7 will be described.

In cases in which the control valve 18 is operated to the neutral position 18N and the check valves 13, 14 are operated to the open state as shown in FIG. 3, when the front wheel axle case 8 and the support bracket 6 begin to swing vertically about the transverse axis P1 in accordance with unevenness in the ground surface, the hydraulic cylinders 7 reciprocate, actuating oil flows back and forth between the oil chambers 7a, 7b of the hydraulic cylinders 7 and the accumulators 11, 12, and the hydraulic cylinders 7 function as a suspension mechanism having a spring constant K1.

In this case, the pressure in the oil chambers 7b of the hydraulic cylinders 7 and in the oil passage 10 is maintained at a set pressure MP1 by the relief valve 28. The following formula (1) holds true when PH is the pressure in the oil chambers 7a of the hydraulic cylinders 7, AH is the pressurized surface area of the pistons of the oil chambers 7a of the hydraulic cylinders 7, AR is the pressurized surface area of the pistons of the oil chambers 7b of the hydraulic cylinders 7 (AR is less than AH in proportion to the pistons), M is the weight on the front part of the vehicle body (the weight on the hydraulic cylinders 7), and g is the gravitational acceleration.

$$M \times g = PH \times AH - MP1 \times AR \quad \text{Formula (1)}$$

Since the set pressure MP1 of the oil chambers 7b of the hydraulic cylinders 7, the pressurized surface area AH of the pistons of the oil chambers 7a of the hydraulic cylinders 7, and the pressurized surface area AR of the pistons of the oil chambers 7b of the hydraulic cylinders 7 are constant, the pressure PH of the oil chambers 7a of the hydraulic cylinders 7 is thereby higher than the set pressure MP1 of the oil chambers 7b of the hydraulic cylinders 7, and the pressure PH varies depending on the weight M on the front part of the vehicle body (the weight on the hydraulic cylinders 7).

The spring constant K1 of the hydraulic cylinders 7 is determined according to the pressures PH, MP1 of the oil chambers 7a, 7b of the hydraulic cylinders 7. The spring constant K1 increases along with an increase in the pressure PH of the oil chambers 7a of the hydraulic cylinders 7, and decreases along with a decrease in the pressure PH of the oil chambers 7a of the hydraulic cylinders 7. Therefore, the spring constant K1 of the hydraulic cylinders 7 is determined according to the weight M on the front part of the vehicle body (the weight on the hydraulic cylinders 7), and the spring constant K1 increases along with an increase in the weight M on the front part of the vehicle body (the weight on the hydraulic cylinders 7) and decreases along with a decrease in the weight M on the front part of the vehicle body (the weight on the hydraulic cylinders 7).

When the control valve 18 is operated to the raised position 18U and the check valves 13, 14 are operated to the shutoff position as shown in FIG. 3, actuating oil is supplied to the oil chambers 7a of the hydraulic cylinders 7 from the control valve 18, and actuating oil is drained from the oil chambers 7b of the hydraulic cylinders 7 via the check valve 24 (operated to the open state by the pilot actuating oil of the control valve 18) and the relief valve 28. In this case, the pressure of the oil chambers 7b of the hydraulic cylinders 7 and the oil passage 10 is maintained at the set pressure MP1 by the relief valve 28.

The hydraulic cylinders 7 thereby extend and the front part of the vehicle body rises (equivalent to a state in which the action of the hydraulic cylinders 7 (the suspension mechanism) has changed to the vehicle body rising direction). When the control valve 18 is then operated to the neutral position 18N and the check valves 13, 14 are operated to the open state, the hydraulic cylinders 7 function as a suspension mechanism as previously described while the hydraulic cylinders 7 remain in an extended state.

When the control valve 18 is operated to the lowered position 18D and the check valves 13, 14 are operated to the shutoff position as shown in FIG. 3, actuating oil is supplied from the control valve 18 to the oil chambers 7b of the hydraulic cylinders 7, and actuating oil is drained from the oil chambers 7a of the hydraulic cylinders 7 via the check valve 23 (operated to the open state by the pilot pressure of the control valve 18), the aperture 25, and the control valve 18. In this case, the pressure of the oil chambers 7b of the hydraulic cylinders 7 and the oil passage 10 is maintained at the set pressure MP1 by the relief valve 28.

The hydraulic cylinders 7 thereby retract and the front part of the vehicle body lowers. When the control valve 18 is then operated to the neutral position 18N and the check valves 13, 14 are operated to the open state, the hydraulic cylinders 7 act as a suspension mechanism as previously described while the hydraulic cylinders 7 remain in a retracted state.

Figure 6:
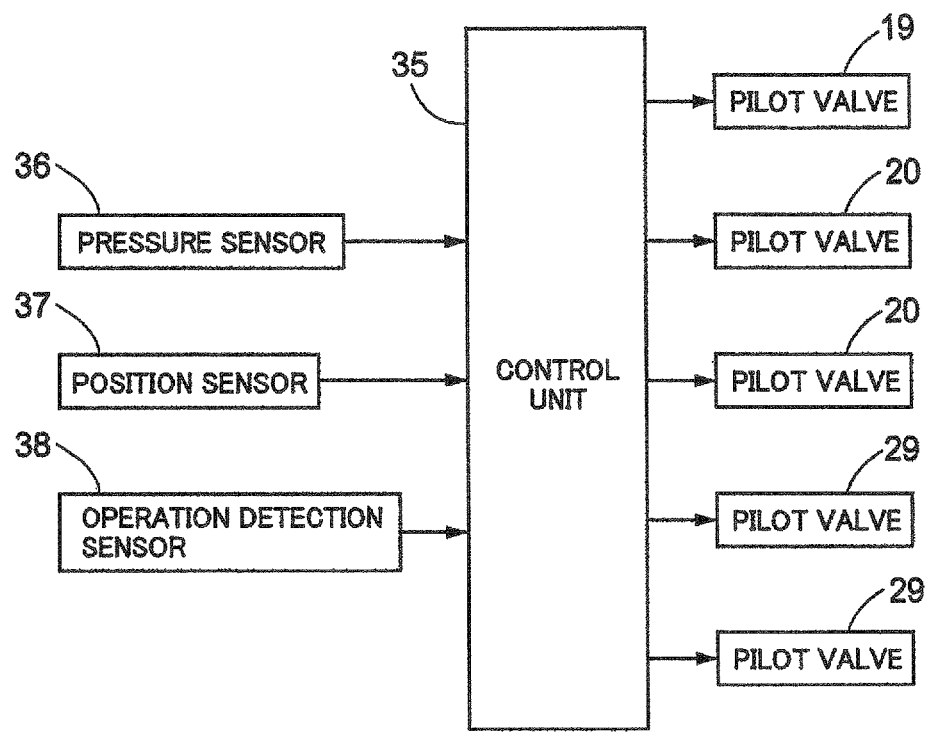
FIG. 6 is a block diagram showing the relationship between the control unit and the pilot valves.

A pressure sensor 36 is provided for detecting the pressure of the oil chambers 7a of the hydraulic cylinders 7 as shown in FIGS. 3 and 6, a detection value of the pressure sensor 36 is inputted to the control unit 35, and the weight M on the front part of the vehicle body (the weight on the hydraulic cylinders 7) is calculated based on the detection value of the pressure sensor 36.

When the implement mounted on the front part of the vehicle body causes the weight M on the front part of the vehicle body (the weight on the hydraulic cylinders 7) to increase (for example, a state in which earth is lifted (loaded) or loads are stacked up by a front loader), the spring constant K1 of the hydraulic cylinders 7 increases, the switching valve 17 is therefore accordingly operated toward an aperture (toward the orifice having a "small" diameter), and the damping force of the hydraulic cylinders 7 increases.

When the implement mounted on the front part of the vehicle body causes the weight M on the front part of the vehicle body (the weight on the hydraulic cylinders 7) to decrease (for example, a state in which earth is released or loads are dropped by the front loader), the spring constant K1 of the hydraulic cylinders 7 decreases, the switching valve 17 is therefore accordingly operated toward an aperture (toward the orifice having a "large" diameter), and the damping force of the hydraulic cylinders 7 decreases.

Figure 5:
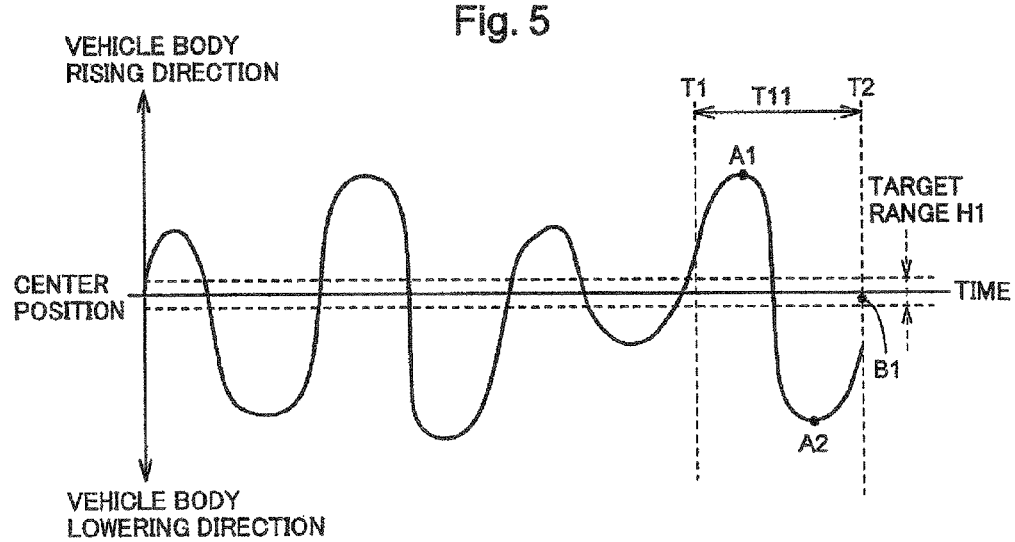
FIG. 5 is a diagram showing the state of the suspension stroke position (extended/retracted position) of the hydraulic cylinders.

As can be seen from the graph of FIG. 5, the maximum value A1 is a value corresponding to a point at which the suspension stroke position of the hydraulic cylinders 7 is displaced in the vehicle body lowering direction after being displaced in the vehicle body rising direction (the point at which the hydraulic cylinders 7 switch from extending to retracting). The minimum position A2 is a value corresponding to the point at which the suspension stroke position of the hydraulic cylinders 7 is displaced in the vehicle body rising direction after being displaced in the vehicle body lowering direction (the point at which the hydraulic cylinders 7 switch from retracting to extending).

In this case, the value corresponding to the suspension stroke position (extended position) of the hydraulic cylinders 7 from the elapsed time point of the previous control cycle T12 to the elapsed time point of the current control cycle T12 (refer to the time point T2 in FIG. 5) is stored as a value corresponding to the new suspension stroke position (extended position) of the hydraulic cylinders 7, and the values which correspond to the hydraulic cylinder 7 suspension stroke positions (extended positions) that are older than the time point T1, which is older than the time point T2 by a set time period T11, are deleted. With each elapse of the control cycle T12, some of the values corresponding to suspension stroke positions (extended positions) of the hydraulic cylinders 7 stored in the control device are renewed.

A suspension stroke position sensor 37 is provided for detecting the suspension stroke position (extended position) of the hydraulic cylinders 7 as shown in FIG. 6, and a detection value of the suspension stroke position sensor 37 is inputted to the control unit 35 and stored in the control unit 35 as a value corresponding to the suspension stroke position (extended position) of the hydraulic cylinders 7. In this case, the suspension stroke position (extended position) of the hydraulic cylinders 7 is detected by attaching a reciprocating suspension stroke position sensor 37 directly to the hydraulic cylinders 7 and detecting the suspension stroke position (extended position) of the hydraulic cylinders 7, or by attaching a rotary suspension stroke position sensor 37 to a position on the transverse axis P1 shown in FIG. 2 and detecting the angle of the support bracket 6 in relation to the support frame 5.

The center position of the action of the hydraulic cylinders 7 shown in FIG. 5 is set by the control unit 35, and when the suspension stroke position (extended position) of the hydraulic cylinders 7 is in the center position, the vehicle body is substantially parallel to the ground surface (substantially horizontal). The control unit 35 sets a target range H1 having a range of a certain extent in the vehicle body rising direction or the vehicle body lowering direction in relation to the center position.

Figure 7:
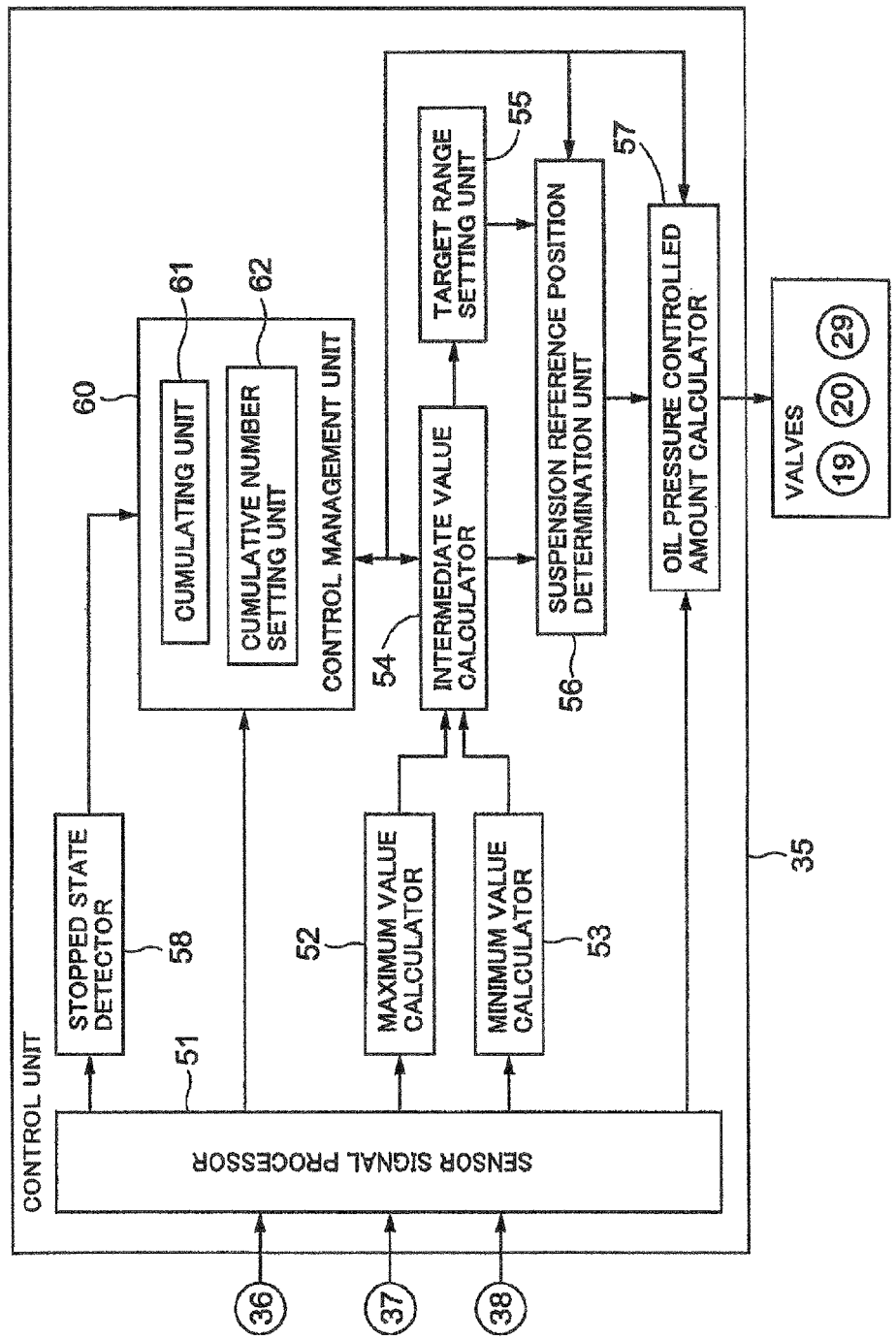
FIG. 7 is a function block diagram showing the functions of the control unit.

FIG. 7 shows functional units installed in the control unit 35, particularly functional units relating to the present invention. Examples of such functional units include a sensor signal processor 51, a maximum value calculator 52, a minimum value calculator 53, an intermediate value calculator 54, a target range setting unit 55, a suspension reference position determination unit 56, an oil pressure controlled amount calculator 57, a stopped state detector 58, and a control management unit 60 for managing these functional units. The control management unit 60 comprises a cumulating unit 61, and a cumulative number setting unit 62.

The sensor signal processor 51 receives detection signals from the pressure sensor 36, the operative position sensor (suspension stroke position sensor) 37, and an operation detection sensor 38 for detecting the operated amounts of operative tools (not shown); and converts the signals into data (values) that will be handled in the control unit 35. The maximum value calculator 52 calculates a maximum value corresponding to the maximum position of the suspension stroke on the basis of the data delivered from the sensor signal processor 51. The minimum value calculator 53 calculates a minimum value corresponding to the minimum position of the suspension stroke on the basis of the data delivered from the sensor signal processor 51. The intermediate value calculator 54 calculates an intermediate value from the maximum value and the minimum value corresponding to the minimum position. The intermediate value is commonly the mean value of the maximum value and the minimum value, but various other options can be used as the intermediate value. For example, the intermediate value may be the mean value of a plurality of the aforementioned mean values, or the intermediate value may be the mean value of a plurality of the aforementioned mean values. Furthermore, the mean value is commonly calculated as an arithmetic mean value, but depending on the suspension design, the mean value can also be a weighted mean value.

The target range setting unit 55 sets a target range for comparison with the intermediate value. The suspension reference position determination unit 56 determines a suspension reference position as a reference position of the suspension stroke (suspension action reference position) of the suspension mechanism (hydraulic cylinders) 7, and, based on this determined suspension reference position, the oil pressure controlled amount calculator 57 calculates a controlled amount for the control valve (equivalent to a suspension reference position variation mechanism) 18 so that the suspension reference position is achieved.

The stopped state detector 58 detects a state of stoppage in the action of the hydraulic cylinders 7 on the basis of information from the sensor signal processor 51 and other units. When a state of stoppage in the action of the suspension mechanism is detected by the stopped state detector 58, the control management unit 60 controls the control valve (equivalent to a suspension reference position variation mechanism) 18 via the pilot valve 29 so that the action of the suspension mechanism 7 moves toward the target range, in preference to control based on the suspension stroke position obtained from the suspension stroke position sensor 37.

Next, the flow of control relating to the suspension mechanism (hydraulic cylinders) 7 will be described using FIGS. 8 and 9.

A first determining number NDS, a second determining number NDL, a first determining number NUS, and a second determining number NUL are set in the cumulative number setting unit 62 of the control management unit 60, and initially the second determining number NDL is set as a lowering determining frequency ND1 while the second determining number NUL is set as a rising determining frequency NU1 (step S1). In this case, the first determining number NDS is set to a lower value than the second determining number NDL, and the first determining number NUS is set to a lower value than the second determining number NUL. A cumulative frequency N is set in the cumulative number setting unit 62 of the control management unit 60.

First, the cumulative frequency N is set to "0" (step S2). The control valve 18 is operated to the neutral position 18N and the check valves 13, 14 are operated to the open state (the hydraulic cylinders 7 acting as a suspension mechanism) (step S3). In this state, counting of the control cycle T12 is initiated (step S4), the suspension stroke position (extended position) of the hydraulic cylinders 7 is detected, and a value corresponding to this position is stored (step S5).

When the control cycle T12 elapses (step S6) (refer to time point T2 in FIG. 5), a maximum value A1 corresponding to the maximum position of the action of the hydraulic cylinders 7 and a minimum value A2 corresponding to the minimum position are detected (step S7) from the values corresponding to all of the suspension stroke positions (extended positions) of the hydraulic cylinders 7 older than the time point T2 by a set time T11 (refer to the span from time point T2 to time point T1 in FIG. 5), and an intermediate value B1 between the maximum and minimum values A1, A2 (an intermediate value between the maximum and minimum values A1, A2) is detected (step S8).

In steps S6 and S7, when the set time period T11 is set to the extent of being slightly longer than one resonance frequency cycle of the hydraulic cylinders 7 (suspension mechanism), one maximum value A1 and one minimum value A2 are detected during the set time period T11, and in this case, an intermediate value B1 is detected from one maximum and minimum value A1, A2 each (step S8).

In steps S6 and S7, when the set time period T11 is set to be somewhat long, a plurality of maximum values A1 and a plurality of minimum values A2 are detected during the set time period T11. In this case, the greatest maximum value A1 is detected among the plurality of maximum values A1, and smallest minimum value A2 is detected among the plurality of minimum values A2, and an intermediate value B1 is detected from the greatest maximum value A1 and the smallest minimum value A2 (step S8).

When the intermediate value B1 is detected the intermediate value B1 and the target range H1 are compared (step S9). When the intermediate value B1 deviates in the vehicle body lowering direction from the target range H1, "1" is subtracted from the cumulative frequency N as an abnormal frequency (step S10), and when the intermediate value B1 deviates in the vehicle body rising direction from the target range H1, "1" is added to the cumulative frequency N (step S11). When the intermediate value B1 enters the target range H1, nothing is added to or subtracted from the cumulative frequency N.

Figure 10:
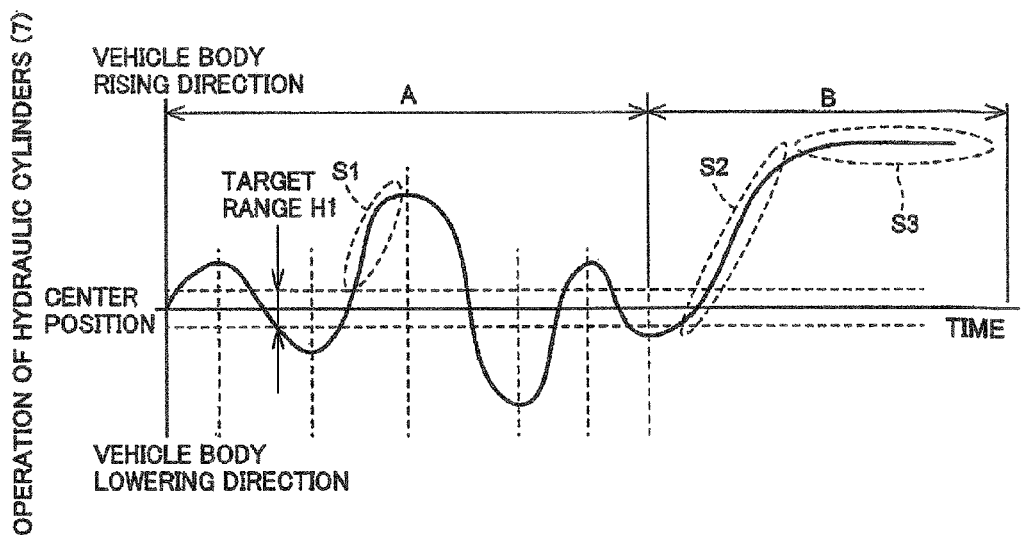
FIG. 10 is an explanatory diagram showing the operative displacement of the hydraulic cylinders.
Figure 11:
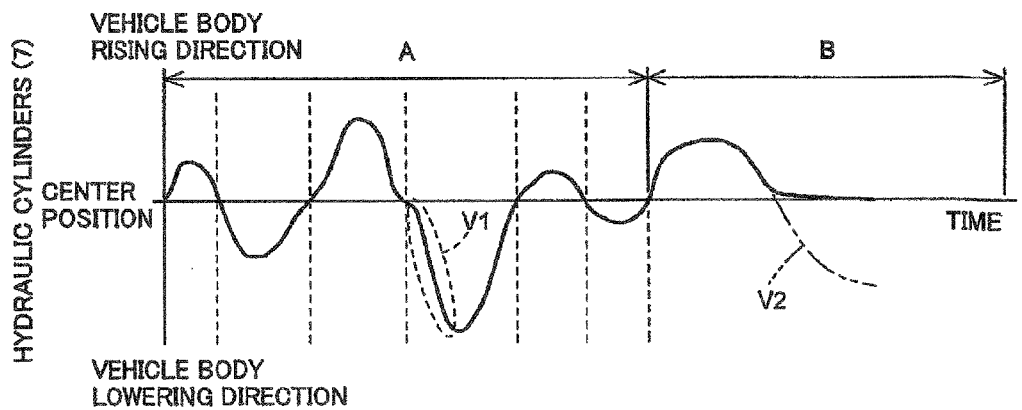
FIG. 11 is an explanatory diagram showing the change in the operating rate of the hydraulic cylinders.

Next, before the continuation of the controlling of the hydraulic cylinders 7 is described, the displacement of the hydraulic cylinders 7 will be additionally described based on FIGS. 10 and 11.

FIG. 10 is an explanatory diagram showing the operational displacement of the hydraulic cylinders 7. FIG. 11 is an explanatory diagram showing the change in operating rate of the hydraulic cylinders 7. The operative displacement shown in range A of FIG. 10 is the operative displacement in the hydraulic cylinders 7 resulting from unevenness in the ground surface, and the operating rate shown in range A of FIG. 11 is the operating range corresponding to the operative displacement shown in range A of FIG. 11. The operating rate V1 shown in FIG. 11 is the operating range occurring after the operative displacement S1 has occurred.

In other words, in cases in which operative displacement in the vehicle body rising direction has occurred in the hydraulic cylinders 7 due to unevenness in the ground surface, return displacement occurs in the vehicle body lowering direction after the operative displacement, and the operation returns to the target range H1. In cases in which operative displacement in the vehicle body lowering direction has occurred in the hydraulic cylinders 7 due to unevenness in the ground surface, return displacement in the vehicle body rising direction occurs after the operative displacement and the operation returns to the target range H1. Therefore, in cases in which operative displacement has occurred in the hydraulic cylinders 7 due to unevenness in the ground surface, even if the operation of the hydraulic cylinders 7 deviates from the target range H1, the operating rate occurring thereafter causes the operation to return to the target range H1. The operating rate that causes the operation of the hydraulic cylinders 7 to return to the target range H1 after deviating from the target range H1 occurs within approximately one-quarter of the characteristic resonance period of the hydraulic cylinders 7.

The operative displacements S2 and S3 in range B of FIG. 10 are operative displacements in which earth has been lifted by a linked front dozer. The operating rate shown in range B of FIG. 11 is the operating rate corresponding to the operative displacements S2 and S3 shown in range B of FIG. 10. The operating rate V2 shown in FIG. 11 represents a hypothetical operating rate corresponding to the operative displacement S2.

In other words, in cases in which an operative displacement in the vehicle body rising direction has occurred in the hydraulic cylinders 7 as a result of the weight of earth lifted by a front dozer, return displacement in the vehicle body lowering direction does not occur. Even if return displacement does occur, the return displacement is small, and the operation does not return to the target range H1. Specifically, in cases in which earth is lifted up by a front loader and operative displacement in the vehicle body rising direction has occurred in the hydraulic cylinders 7 as a result of the weight of the lifted earth, the operation of the hydraulic cylinders 7 stops in a position outside of the target range H1, there is no return displacement back to the target range H1, and the operating rate shown by the hypothetical operating rate V2 does not occur.

In cases in which earth is released by the front dozer, the loss of the load from the earth weight applied to the traveling vehicle body until the earth was released causes the operative displacement occurring in the hydraulic cylinders 7 to be operative displacement in the vehicle body lowering direction. Therefore, the case of releasing earth differs from the case of lifting earth in terms of the displacement direction of operative displacement, but is similar to the case of lifting earth with respect to the fact that the operation of the hydraulic cylinders 7 stops at a position outside of the target range H1, return displacement back to the target range H1 does not occur, and an operating rate for returning to the target range H1 does not occur.

The stopped state detector 58 detects states of stoppage in the operation of the hydraulic cylinders 7 on the basis of detection information from the position sensor 37.

Specifically, operation data of the hydraulic cylinders 7 as detected by the position sensor 37 is differentially processed and the operating rate of the hydraulic cylinders 7 is calculated. After the operation of the hydraulic cylinders 7 has deviated from the target range H1, it is determined whether or not there is an operating rate for returning the displacement of the operation of the hydraulic cylinders 7 back to the target range H1, and the value of the return displacement operating rate is determined in the case that there is a return displacement operating rate. In cases in which it is determined that a return displacement operating rate has not occurred from the time the operation of the hydraulic cylinders 7 deviates from the target range H1 until the set measurement time elapses, and in cases in which a return displacement operating rate has occurred and it is judged that the value of the occurring return displacement operating rate is less than the set reference value, the hydraulic cylinders 7 are detected to have stopped operating after the operation of the hydraulic cylinders 7 has deviated from the target range H1. A time period greater than one-quarter of the characteristic resonance period of the hydraulic cylinders 7 is set as the set measurement time.

When the intermediate value B1 has been detected, the intermediate value B1 and the target range H1 have been compared, and the cumulative frequency N has been added to or subtracted from (steps S4 to S11), the control unit 35 determines for each instance thereof whether or not the stopped state detector 58 has detected an state of stopped operation (step S12). In cases in which it has been determined that the stopped state detector 58 has detected a state of stopped operation, the control management unit 60 measures the elapsed time t after following the detection of the state of stopped operation.

The control management unit 60 sets a lowering setting cumulative frequency ND1 (equivalent to the set cumulative frequency) and a rising setting cumulative frequency NU1 (equivalent to the set cumulative frequency) relative to the cumulative number setting unit 62.

A first reference number NDS, a second reference number NDL, a first reference number NUS, and a second reference number NUL are set in the control unit 35. The control management unit 60 first sets the second reference number NDL as the lowering setting cumulative frequency ND1 and the second reference number NUL as the rising setting cumulative frequency NU1 in the cumulative number setting unit 62 (step S1). In this case, the first reference number NDS is set to a lower value than the second reference number NDL, and the first reference number NUS is set to a lower value than the second reference number NUL.

In a state in which the second reference number NDL has been set as the lowering setting cumulative frequency ND1 (equivalent to the operating frequency decreasing) and the second reference number NUL has been set as the rising setting cumulative frequency NU1 (equivalent to the operating frequency decreasing), and also when it has been determined that the implement-rising operation has been performed, the control management unit 60 sets the first reference number NDS as the lowering setting cumulative frequency ND1 (equivalent to the operating frequency increasing) and the first reference number NUS as the rising setting cumulative frequency NU1 (equivalent to the operating frequency increasing) (step S14).

A designated elapsed time t0 following the detection of the state of stopped operation by the stopped state detector 58 is set. For this designated elapsed time t0, approximately 10 seconds is preferred as the time needed in order to make the adjustments for returning the operation of the hydraulic cylinders 7 from the stopped state of operation back to the target range H1.

The first reference number NDS is maintained as the lowering setting cumulative frequency ND1 and the first reference number NUS is maintained as the rising setting cumulative frequency NU1 until the designated elapsed time t0 following the detection of the state of stopped operation by the stopped state detector 58 reaches the designated elapsed time t0. When the elapsed time t following the detection of the state of stopped operation by the stopped state detector 58 reaches the designated elapsed time t0, the original second reference number NDL is restored as the lowering setting cumulative frequency ND1, and the original second reference number NUL is restored as the rising setting cumulative frequency NU1.

When the lowering setting cumulative frequency ND1 and the rising setting cumulative frequency NU1 are set as previously described, the cumulative frequency N is compared with the lowering setting cumulative frequency ND1 and the rising setting cumulative frequency NU1, and it is determined that the cumulative frequency N has reached (or fallen below) the lowering setting cumulative frequency ND1 (step S16); the front part of the vehicle body lowers, it is determined that the vehicle body is in a forward decline in relation to the ground surface, the control valve 18 is controlled to the raised position 18U, and the check valves 13, 14 are controlled to the operating state (step S17).

The hydraulic cylinders 7 thereby extend and raise the front part of the vehicle body in a state in which the pressure in the oil chambers 7b of the hydraulic cylinders 7 and the oil passage 10 is maintained at the set pressure MP1 by the relief valve 28. When the hydraulic cylinders 7 extend in proportion to the difference between the intermediate value B1 and the target range H1 (when the intermediate value B1 enters the target range H1), the process advances to step S2, the cumulative frequency N is set to "0," and the control valve 18 is operated to the neutral position 18N, returning to a state in which the check valves 13, 14 have been operated to the open state (a state in which the hydraulic cylinders 7 act as a suspension mechanism).

When it is determined that the cumulative frequency N has reached (or exceeded) the rising setting cumulative frequency NU1 (step S19), it is judged that the front part of the vehicle body has risen and the vehicle body is in a forward incline in relation to the ground surface, the control valve 18 is controlled to the lowered position 18D, and the check valves 13, 14 are controlled to the operating state (step S19).

The hydraulic cylinders 7 thereby retract and lower the front part of the vehicle body in a state in which the pressure in the oil chambers 7b of the hydraulic cylinders 7 and the oil passage 10 is maintained at the set pressure MP1 by the relief valve 28. When the hydraulic cylinders 7 retract in proportion to the difference between the intermediate value B1 and the target range H1 (when the intermediate value B1 enters the target range H1), the process advances to step S2, the cumulative frequency N is set to "0," and the control valve 18 is operated to the neutral position 18N, returning to a state in which the check valves 13, 14 have been operated to the open state (a state in which the hydraulic cylinders 7 act as a suspension mechanism).

Thus, if the cumulative frequency N does not reach (or fall below) the lowering setting cumulative frequency ND1 (step S16) and the rising cumulative frequency NU does not reach (or exceed) the rising setting cumulative frequency NU1 (step S18) even if steps S4 through S11 are repeated, a state is maintained in which the control valve 18 is operated to the neutral position 18N and the check valves 13, 14 are operated to the open position (a state in which the hydraulic cylinders 7 act as a suspension mechanism).

Therefore, in cases in which operative displacement has occurred in the hydraulic cylinders 7 such that the operation of the hydraulic cylinders 7 has deviated from the target range H1 in the vehicle body rising direction and the vehicle body lowering direction and the operation of the hydraulic cylinders 7 will be returned to the target range H1, the control management unit 60 uses the normally used lower-operational frequency second reference number NDL and second reference number NUL as the cumulative frequency for the cumulating unit 61, whereby the control valve 18 is controlled on the basis of the detection information from the suspension stroke position sensor 37, and the hydraulic cylinders 7 move toward the target range in a state in which the frequency of operating the control valve 18 has been reduced so that the operation of the hydraulic cylinders 7 moves toward the target range (steps S1 to 12 and 16 to 19).

In cases in which operative displacement has occurred in the hydraulic cylinders 7 such that the operation of the hydraulic cylinders 7 has deviated from the target range H1 in the vehicle body rising direction and the vehicle body lowering direction, and the operation of the hydraulic cylinders 7 will not return to the target range H1, such as is the case when earth is lifted or released by the front loader; the control management unit 60 uses the higher-operational frequency first reference number NDS and first reference number NUS as the cumulative frequency of the cumulating unit 61 in preference to the normally used lower-frequency second reference number NDL and second reference number NUL, on the basis of the detection information from the stopped state detector 58. The control valve 18 is thereby controlled via the control unit 35 in preference to the detection information from the suspension stroke position sensor 37, and suspension control is performed for moving the operation of the hydraulic cylinders 7 toward the target range in a state in which the frequency of operating the control valve 18 has been increased so that the operation of the hydraulic cylinders 7 moves toward the target range (steps S1 to S19).

In steps S4 to S8 of FIG. 8, in cases in which a long set time period T11 is set and the configuration is designed so that a plurality of maximum values A1 and a plurality of minimum values A2 are detected, the intermediate value B1 of step S8 in FIG. 8 may be detected in the following manner.

Figure 8:
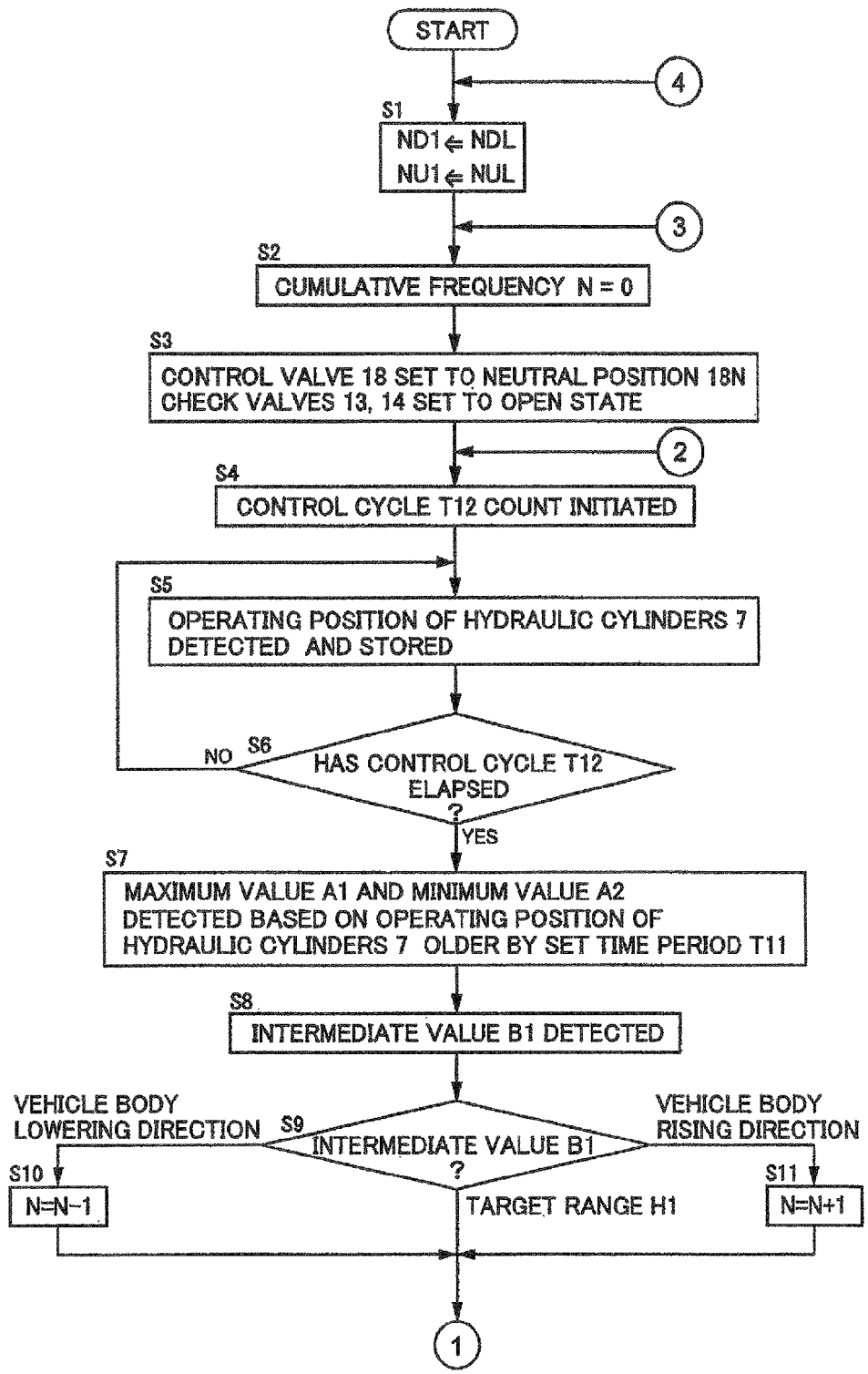
FIG. 8 is a diagram showing the first half of the flow of controlling the hydraulic cylinders.
Figure 9:
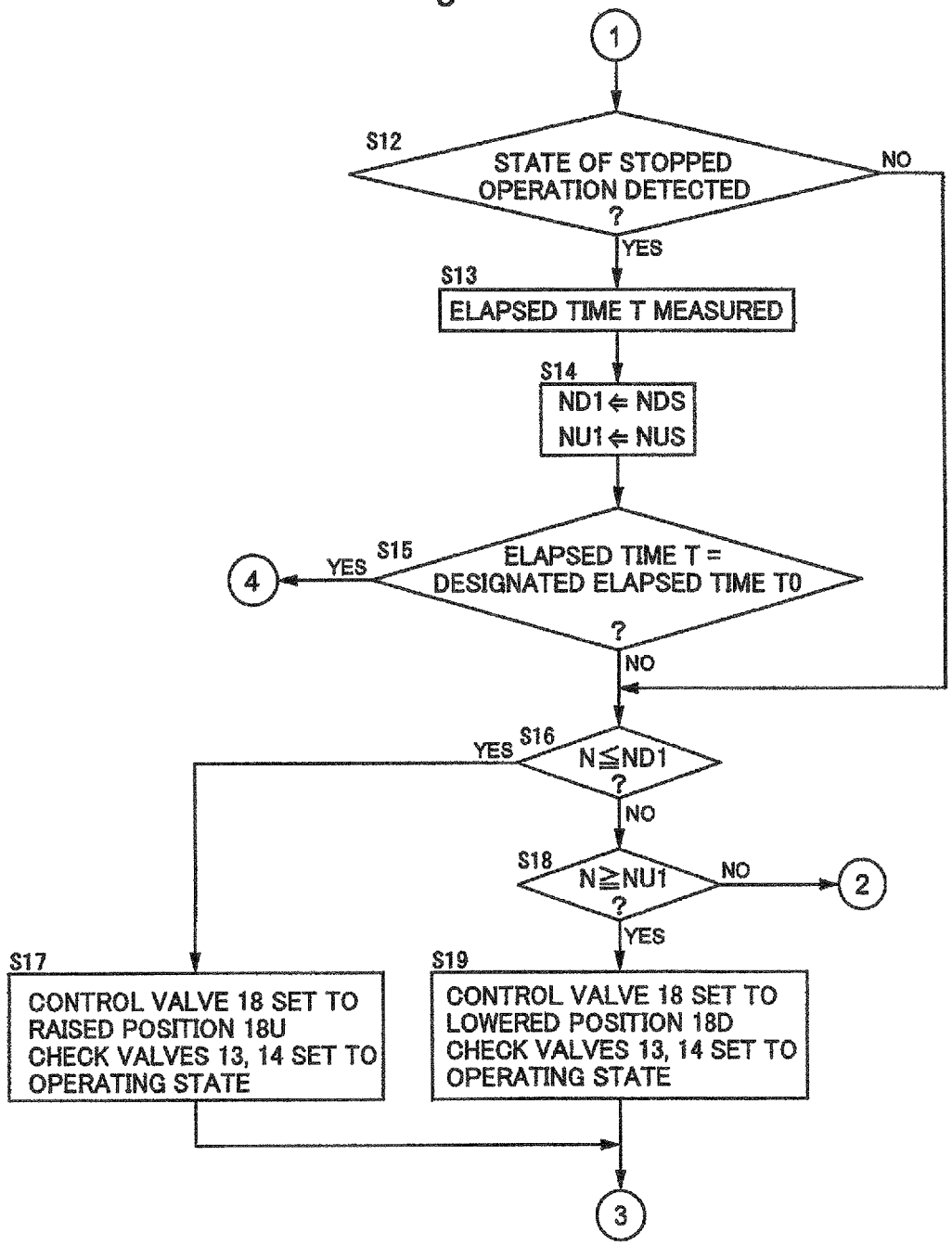
FIG. 9 is a diagram showing the second half of the flow of controlling the hydraulic cylinders.

(1) These pluralities of maximum values A1 and minimum values A2 are divided into multiple groups of maximum values and minimum values A1, A2 in which one maximum value A1 and one minimum value A2 constitute one group, and an intermediate value B1 is detected in each group, whereby a plurality of intermediate values B1 are detected, and the mean value of these intermediate values B1 is used as the intermediate value B1 in step S8 of FIG. 8.

(2) The mean value of the maximum values A1 is detected from the plurality of maximum values A1, the mean value of the minimum values A2 is detected from the plurality of minimum values A2, and an intermediate value B1 is detected from the mean values of the maximum and minimum values A1, A2 and is used as the intermediate value B1 of step S8 in FIG. 8.

Additional Embodiments

A First Additional Embodiment differing somewhat from the embodiment described above is described hereinbelow.

The hydraulic suspension system according to this Additional Embodiment is composed of the following constituent elements:

(a) a suspension mechanism for a traveling vehicle body;

(b) a suspension reference position variation mechanism for varying the reference position of the suspension stroke of the suspension mechanism;

(c) a suspension stroke position sensor for detecting the suspension stroke position;

(d) a control unit for controlling the suspension reference position variation mechanism on the basis of the suspension stroke position so that the stroke of the suspension mechanism moves toward a preset target range;

(e) an operation detector for detecting the raising/lowering operation of the implement; and (f) a control management unit for increasing the control frequency for the suspension reference position variation mechanism to be greater than the frequency in cases in which the implement is not raised or lowered, on the basis of raising/lowering operation information generated by the operation detector.

In cases in which the implement raising operation has been performed in the hydraulic suspension system according to this First Additional Embodiment, the frequency with which the control valve 18 acts as a suspension reference position variation mechanism is increased by the operation of the control management unit 58 so as to be greater than the frequency in cases of no raising/lowering operation. Thereby, in cases in which the implement is not raised or lowered, the operating frequency of the suspension reference position variation mechanism decreases so as to be less than cases in which a raising/lowering operation is performed, and deterioration of the suspension reference position variation mechanism is prevented. At the same time, the operation of the suspension mechanism is moved toward the target range, whereby the terrain clearance of the traveling vehicle body can be adjusted so as to be within a predetermined height range. In cases in which an implement raising/lowering operation has been performed, the operating frequency of the control valve 18 as a suspension reference position variation mechanism is increased so as to be greater than in cases of no raising/lowering operation. It is thereby possible to quickly adapt to operative displacement in the suspension mechanism accompanying raising or lowering of the implement, to perform an operation for moving the operation of the suspension mechanism to the target range, and to quickly make adjustments so that the terrain clearance of the traveling vehicle body conforms to a predetermined height range.

Therefore, it is possible to absorb unevenness in the terrain through the action of the suspension mechanism and make the ride more comfortable, and also to work in an easily workable manner wherein the terrain clearance of the traveling vehicle body and implement is in a predetermined height or substantially in the predetermined height, both in cases in which the implement has been raised or lowered and in cases in which the implement has not been raised or lowered. Moreover, in cases in which the implement is not raised or lowered, the operating frequency of the suspension reference position variation mechanism is reduced to be less than in cases in which the implement is raised or lowered, deterioration in the operation variation means is suppressed, and the operation variation means can be provided with superior durability. In cases in which the implement has been raised or lowered, it is possible to quickly adapt to operative displacement of the suspension mechanism caused by raising or lowering the implement, to move the operation of the suspension mechanism toward the target range, to quickly adjust the traveling vehicle body and implement to an appropriate terrain clearance or to a height close thereto, and to work in an easily workable manner.

Furthermore, the following is a description of a Second Additional Embodiment resembling the First Additional Embodiment, whereby the same effects as those described above can be obtained.

The hydraulic suspension system according to this Additional Embodiment is composed of the following constituent elements:

(a) a suspension mechanism for a traveling vehicle body;

(b) a suspension reference position variation mechanism for varying the reference position of the suspension stroke of the suspension mechanism;

(X) an intermediate value calculator for detecting the maximum position and minimum position of the suspension stroke and calculating an intermediate value between the maximum and minimum positions;

(Y) a cumulating unit for cumulating the frequency at which the intermediate position deviates from a target range as a cumulative frequency;

(d') a control unit for controlling the operation variation mechanism so that the intermediate position moves in a preset target direction when the cumulative frequency obtained from the cumulating unit exceeds a preset cumulative frequency;

(e) an operation detector for detecting the raising/lowering operation of the implement; and (f') a control management unit for varying the set cumulative frequency set in advance on the basis of raising/lowering operation information generated by the operation detector; so that when an operation of raising or lowering the implement is performed, the set cumulative frequency decreases from the time the raising/lowering operation is performed until a designated elapsed time has elapsed, and the preset cumulative frequency increases after the designated elapsed time has elapsed since the raising/lowering operation was performed.

In the hydraulic suspension system according to this Second Additional Embodiment, when an operation for raising or lowering the implement is performed, the set cumulative frequency decreases from the time the raising/lowering operation is performed until the designated elapsed time elapses. Furthermore, since the set cumulative frequency increases after the designated elapsed time has elapsed since the raising/lowering operation was performed, the operating frequency of the control valve 18 as a suspension reference position variation mechanism is higher in cases in which an operation for raising or lowering the implement is performed than in cases in which the implement is not raised or lowered. It is thereby possible to quickly adapt to operative displacement of the suspension mechanism accompanying the raising or lowering of the implement, to move the operation of the suspension mechanism to the target range, and to quickly make adjustments so that the ground clearance of the vehicle body conforms to the predetermined height range.

What is claimed is:

1. A hydraulic suspension system for a work vehicle equipped with an implement, comprising:
    a suspension mechanism for a traveling vehicle body;
    a suspension reference position variation mechanism for varying a reference position of a suspension stroke of the suspension mechanism;
    a suspension stroke position sensor for detecting a suspension stroke position;
    a control unit for controlling the suspension reference position variation mechanism on a basis of the suspension stroke position so that the suspension stroke of the suspension mechanism moves toward a preset target range;
    an operation detector for detecting an operation for raising or lowering the implement; and a control management unit for increasing a control frequency of the suspension reference position variation mechanism to be greater than a frequency when the implement is not being raised or lowered, on a basis of raising or lowering operation information generated by the operation detector.

2. The hydraulic suspension system of claim 1, wherein the control management unit returns the control frequency to the frequency before the raising or lowering operation was performed, after a designated elapsed time has elapsed since the raising or lowering operation was performed for the implement.

3. The hydraulic suspension system of claim 2, wherein the suspension mechanism includes a hydraulic cylinder, an accumulator, and a control valve operable to supply or drain oil from a pump;

the accumulator is connected to an oil chamber of the hydraulic cylinder;

the control valve is connected to an oil passage for connecting the oil chamber of the hydraulic cylinder to the accumulator, to perform pressure control of the oil chamber of the hydraulic cylinder for varying the reference position of the suspension stroke of the suspension mechanism in a vehicle body rising direction or a vehicle body lowering direction; and the control frequency is varied when an operation frequency of the valve is varied by the control management unit.

4. A hydraulic suspension system for a work vehicle equipped with an implement, comprising:

a suspension mechanism for a traveling vehicle body;

a suspension reference position variation mechanism for varying a reference position of a suspension stroke of the suspension mechanism;

an intermediate value calculator for detecting a maximum position and a minimum position of the suspension stroke and calculating an intermediate value between the maximum and minimum positions to determine an intermediate position;

a cumulating unit for cumulating a frequency at which the intermediate position deviates from a target range as a cumulative frequency;

a control unit for controlling the suspension reference position variation mechanism so that the intermediate position moves in a preset target direction when the cumulative frequency obtained from the cumulating unit exceeds a preset cumulative frequency;

an operation detector for detecting an operation for raising or lowering the implement; and a control management unit for varying the preset cumulative frequency on a basis of raising or lowering operation information generated by the operation detector so that when the operation of raising or lowering the implement is performed, the preset cumulative frequency decreases from a time the raising or lowering operation is performed until a designated elapsed time has elapsed, and the preset cumulative frequency increases after the designated elapsed time has elapsed since the raising or lowering operation was performed.

5. The hydraulic suspension system of claim 4, wherein the suspension mechanism includes a hydraulic cylinder, an accumulator, and a control valve operable to supply or drain oil from a pump;

the accumulator is connected to an oil chamber of the hydraulic cylinder;

the control valve is connected to an oil passage for connecting the oil chamber of the hydraulic cylinder to the accumulator, to perform pressure control of the oil chamber of the hydraulic cylinder for varying the reference position of the suspension stroke of the suspension mechanism in a vehicle body rising direction or a vehicle body lowering direction; and the designated elapsed time is a period of time necessary to make adjustments for returning an operation of the hydraulic cylinder from a stopped state of operation back to the target range.

6. The hydraulic suspension system of claim 5, wherein the designated elapsed time is approximately 10 seconds.

\* \* \* \* \*